Jan. 29, 1963     C. C. COOKE ETAL     3,075,371
METHOD OF FORMING GLASS ARTICLES
Filed Dec. 18, 1956

INVENTORS
Charles C. Cooke
Joseph C. Hamilton
BY
J. R. Nelson &
Leonard D. Soubier
ATTORNEYS United States Patent Office 3,075,371
Patented Jan. 29, 1963

3,075,371
METHOD OF FORMING GLASS ARTICLES
Charles C. Cooke and Joseph C. Hamilton, Toledo, Ohio, assignors to Owens-Illinois Glass Company, a corporation of Ohio
Filed Dec. 18, 1956, Ser. No. 629,177
5 Claims. (Cl. 65—35)

This invention relates to a method for forming glass articles from measured charges of glass worked preliminarily to a predetermined shape and then loaded to a mold and shaped therein in final form, and more particularly to working such charges of glass by high speed vibratory mechanism.

In present practice, large molded glass articles, for example, television face plates and other heavy weight pressed articles, are formed by loading a gob of glass into a mold defining the final shape of the article and usually pressed into their final shape. The shape of this gob when loaded to the mold is usually cylindrical in form so that it tends to settle into the mold and the resultant distribution of the glass of the gob relative to the mold contour tends to be non-symmetrical. This presents the problem of excessive movement of certain portions of the glass in the gob during the pressing or other molding and certain areas of the lip of the mold are thus either filled unequally or excessively chilled during such excess movement. This in turn leads to the possible development of surface defects. It is contemplated that defects due to causes of this nature would be reduced if it were possible to load the blank with a symmetrically shaped glass charge, such charge preferably being proportionate to the contours of the mold.

Since certain practical limitations must be recognized in the ability to produce a piece of glass from a standard gob feeder which would conform to the shape of the mold, certain shaping elements may be introduced between the gob feeder and the mold to shape the mold charge. In shaping the mold charge, care must be exercised in the process to insure that the glass of the mold charge reaches the mold at a desirable uniform working temperature. This temperature must be kept uniform through the charge as nearly as can be at time of its loading in the mold to facilitate a uniform distribution in the mold during forming. If metallic shaping members are utilized to shape the mold charge and these members are to come into contact with the molten glass, the temperature of the metal shaping members must be very accurately controlled within operating limits. If the metal shaping members are kept at too high a temperature, the glass will stick to the metal and cause surface imperfections when removed; yet on the other hand, if these metal shaping members are too cool in temperature the surface of the glass is chilled, resulting in impairment of the moldability of the glass during shaping of the finished article in the mold.

It is therefore, an object of the present invention to provide a method of forming glass articles from a charge of molten glass which is initially shaped to resemble the contour of the forming mold, and thereby overcome the aforementioned defects.

Another object of the invention is to provide a method for producing glass articles by shaping a gravity fed stream of molten glass under the force of adjacent shaped columns of air alternately compressed and expanded against said stream by high speed vibratory motion of shaped members.

Another object of the invention is to provide a method for producing glass articles by shaping a mold charge from a stream of glass by contact with a high speed vibratory force without detrimentally decreasing the temperature of the glass by contact of the shaping force therewith.

Another object of the invention is the provision of a method for economically and efficiently producing heavy weight glass articles in a mold, said articles being accurately controlled in dimension.

Another object of the invention is to provide a continuous method of forming a succession of glass articles from shaped mold charges in which the mold charges are worked and delivered to a finishing mold with a minimum but uniform heat loss.

The specific nature of this invention, as well as other objects and advantages thereof, will become apparent to those skilled in the art from the following detailed description, taken in conjunction with the annexed sheet of drawings on which, by way of preferred example only, are illustrated several embodiments of this invention.

Figure 1:
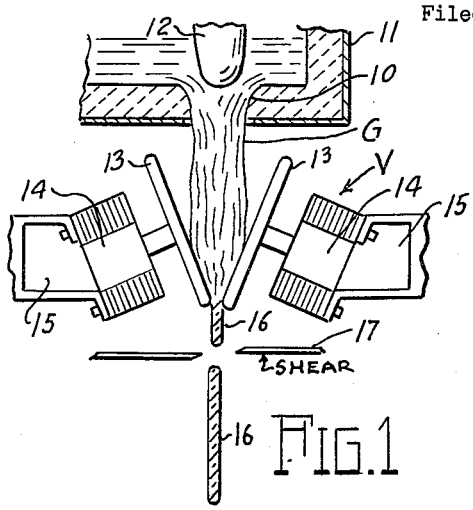
FIG. 1 is a sectional elevational view of apparatus for performing the step of shaping and then severing mold charges from a stream of glass issued from a furnace feeder.

In FIG. 1 molten glass G is fed through an orifice 10 in a conventional forehearth feeder 11 in the form of a flowing stream. The discharge of the stream through orifice 10 is regulated by the reciprocating action of conventional needle plunger 12. As the stream of molten glass G flows downwardly it is contacted by lateral forces induced by a high speed vibratory mechanism V. Mechanism V includes opposed shaped members 13, having shaped contours defining a desired shape for working a mold charge from said stream G. Members 13 are reciprocated at high speed by solenoids 14, the armature of which is attached to fixed support members 15, so that as the armature reciprocates the connected opposed members 13 vibrate along opposite sides of the molten stream G. The stroke of vibration need be only a few thousandths of an inch. The speed of vibration is such that a column of air but a few thousandths of an inch in thickness is alternately compressed and expanded between the interior surface of members 13 and the exterior of molten stream G. The air is alternately compressed and expanded within very narrow limits due to the stroke of vibration of members 13 and it is this action of the air column that supplies the force necessary to shape molten stream G to the desired cross section of mold charge 16, shown issuing from the bottom lip of members 13. Measured shaped mold charges are severed from the shaped stream by shear members 17 reciprocating across each other in such timed relation as to give the desired length of mold charge 16.

Figure 2:
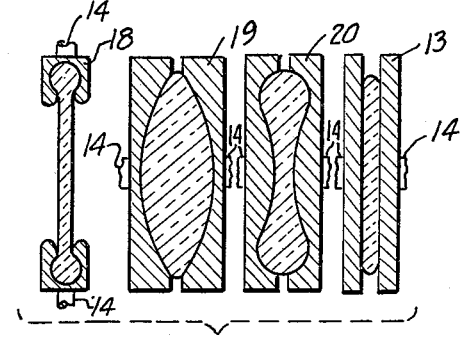
FIG. 2 is a sectional top view of various shapes of shaping member which may be employed to produce a desired cross section of mold charges.
Figure 5:
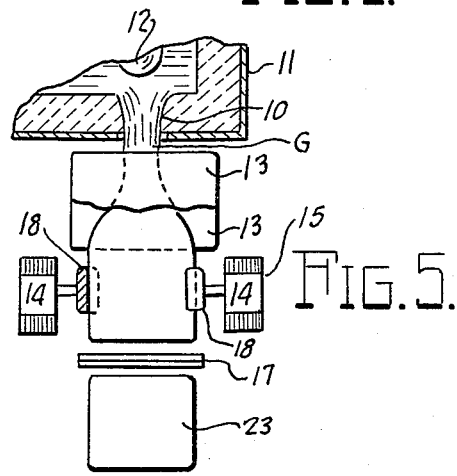
FIG. 5 is a sectional elevational view of apparatus utilized in performing another modification of the method of this invention, wherein a flowing stream of molten glass is shaped in two lateral dimensions by independently induced vibratory forces and severed to measured lengths as mold charges.

Members 13 may be replaced by the members 19 or 20 (FIG. 2) or members 13 may be used in combination with the members 18–20 (for example, see FIG. 5). These various shapes of members 13 and 18–20 provide the select shape of cross section through the mold charge 16 which most nearly resembles the particular type of finishing mold employed.

Figure 3:
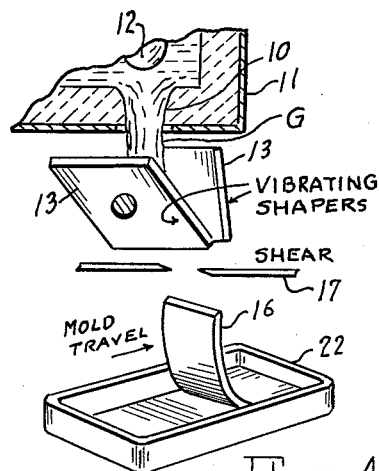
FIG. 3 is a sectional elevational view showing a modification of the method of the present invention, in which the flowing stream of glass is first severed and then shaped to desired mold charges by vibratory force.

FIG. 3 represents a modification of the method, in which the stream of molten glass G is accelerated by reciprocation of the needle plunger 12 to discharge measured charges of molten glass from the orifice 10 in furnace forehearth 11. Shear members 17 are adapted to sever the charges from the stream G to form a gob 21. As a gob 21 falls by gravity, it passes between members 13 and is contacted by the high speed vibratory forces induced by these opposed shaped members 13. Members 13 are actuated as previously described to alternately compress and expand shaped columns of air existing between the surfaces of the gob and members 13 and thereby shape the gob into a mold charge having a shape approximating that of the mold into which it is to be deposited.

Figure 4:
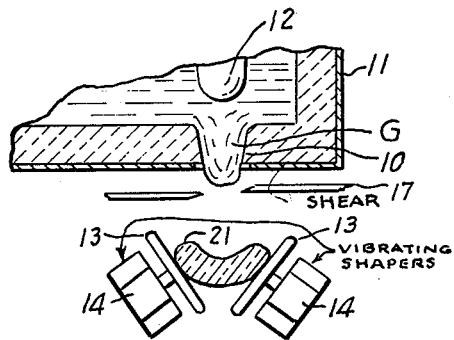
FIG. 4 is a perspective view schematically representing an advanced step of the method of this invention, wherein the leading end of shaped mold charges are contacted by a traveling mold and measured lengths severed and deposited therein for shaping to final form.

As is seen in FIG. 4, the leading end of the shaped mold charge, whether severed from the stream of molten glass G before or after shaping, will be brought into contact with the bottom of a traveling mold 22 and be thereby deposited in mold 22 as it travels through and past the point of initial contact with mold charge 16.

Thus, the continuous flow of stream G which is shaped by vibratory forces induced at members 13 and severed into measured mold charges by shears 17 (shown in FIG. 1) is continued by contacting a mold 22 with the leading end of the shaped stream before severing to begin receiving the mold charge 16 in mold 22 and then severing a measured length from stream G in the form of mold charge 16 which lays into mold 22. The method may also be practiced by issuing molten glass in the form of stream G, severing measured gobs or charges by shears 17 and shaping the severed charges by contact with the aforementioned shaped high speed vibratory forces induced by members 13 and contacting a mold with the leading end of said severed charge 21 as it issues past the lower lip of members 13.

FIG. 5 represents a further modification of the method of the invention wherein the stream of molten glass G is shaped along one of its transverse dimensions by contacting its opposed surfaces with opposed high speed vibratory forces induced by shaped members 13 and solenoids 14, which forces are applied along that dimension. The stream that is shaped in this one dimension is then shaped along its other transverse dimension by contacting opposed surfaces in that other dimension by high speed vibratory forces induced by shaped members 18 actuated by solenoids 14, and then severing measured lengths of said shaped stream into mold charges 23 by shears 17. These charges are loaded into a mold (not shown) and shaped to final form.

In all modifications of this invention the important principles of the invention are present, viz., the molten glass is shaped to predetermined form from a stream by contacting it with high speed vibratory forces of an alternately compressed and expanded film of air without the glass coming into actual physical contact with the metal surfaces, and thus, does not detrimentally affect the temperature of the molten glass. The molten glass is severed from the stream and shaped to a predetermined shape of mold charge to facilitate easy molding to final shape with a minimum amount of displacement of the glass of the mold charge during the final shaping step of the molding operation.

In all modifications of the method, the glass is delivered from the orifice of the furnace to the mold with a minimum temperature loss, and the shaped mold charges are formed in such manner that they are always delivered to the mold uniformly with minimum variation, one charge to the other, in respect to any heat loss, all of which is of critical importance in the production of homogeneous glass articles that are successively uniform in shape and temperature.

Various modifications may be resorted to within the spirit and scope of the appended claims.

We claim:

1. The method of forming glass articles from molten glass which comprises continuously flowing a stream of glass from an outlet orifice, accelerating the discharge of measured charges of glass from said orifice, severing and dropping said charges from said stream for fall under force of gravity, imparting a preliminary shape to each severed charge by contact with shaped high speed vibratory mechanism during said fall, depositing said charge in a shaping mold and imparting a final shape to said charge in a shaping mold.

2. The method of forming glass articles from molten glass which comprises continuously flowing a stream of glass from an outlet orifice, accelerating the discharge of measured charges of glass from said orifice, severing and dropping said charges from said stream to fall by gravity, imparting a preliminary shape to each severed charge by concentrated high speed resilient forces applied against substantially opposite surfaces of said charge during said fall, depositing each said preliminary shaped charge in the cavity of a shaping mold and shaping each charge to the cavity of said mold.

3. The method of forming glass articles from molten glass which comprises continuously flowing a stream of glass from an outlet orifice, accelerating the discharge of measured charges of glass from an orifice, severing said charge from said stream for gravity fall, providing a preliminary shape to the severed charge through vibratory impact from a high speed gaseous medium applied during said fall of the severed charge, depositing said preliminary shaped charge in a cavity of a shaping mold and pressing said charge to final form.

4. The method of forming glass articles from molten glass which comprises continuously flowing a stream of glass from an outlet orifice, severing measured lengths from said stream and allowing said lengths to fall by gravity, successively subjecting the opposite surfaces of each said severed length during falling movement thereof to transverse high speed vibrations of adjacent shaped columns of air to form a shaped blank charge, said vibrations being induced by high speed vibration of opposed shaping members reciprocating at high speed, depositing said shaped charges in a cavity of a shaping mold, and shaping said charges to final form in said mold.

5. The method of forming glass articles from molten glass which comprises continuously issuing a stream of molten glass from an outlet orifice, severing and dropping measured charges therefrom for fall by gravity, encompassing each successive charge between shaping surfaces moving under high speed vibration during said fall of each said charge, said surfaces being arranged to provide a preliminary molded shape to each said charge, depositing said preliminary shaped charge in the cavity of a mold and subsequently finally shaping said charge to the cavity of said mold.

References Cited in the file of this patent

UNITED STATES PATENTS

| | | |
|---|---|---|
| 1,833,479 | Barker | Nov. 24, 1931 |
| 1,873,022 | Peiler | Aug. 23, 1932 |
| 2,073,571 | Steimer | Mar. 9, 1937 |
| 2,179,317 | Barnard | Nov. 7, 1939 |
| 2,293,860 | Sloan | Aug. 25, 1942 |
| 2,320,341 | Bowes | June 1, 1943 |
| 2,717,474 | Barradell-Smith | Sept. 13, 1955 |